US010482450B2

(12) United States Patent
Quentin (10) Patent No.: US 10,482,450 B2
(45) Date of Patent: Nov. 19, 2019

(54) METHOD FOR PROCESSING AN AUTHORIZATION TO IMPLEMENT A SERVICE, DEVICES AND CORRESPONDING COMPUTER PROGRAM

(71) Applicant: INGENICO GROUP, Paris (FR)

(72) Inventor: Pierre Quentin, Enghien des Bains (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/542,436

(22) PCT Filed: Jan. 8, 2016

(86) PCT No.: PCT/EP2016/050316
§ 371 (c)(1),
(2) Date: Jul. 9, 2017

(87) PCT Pub. No.: WO2016/110588
PCT Pub. Date: Jul. 14, 2016

(65) Prior Publication Data
US 2018/0007052 A1  Jan. 4, 2018

(30) Foreign Application Priority Data

Jan. 9, 2015 (FR) ..................................... 15 50191
Jan. 9, 2015 (FR) ..................................... 15 50192
(Continued)

(51) Int. Cl.
*H04W 12/12* (2009.01)
*G06Q 20/40* (2012.01)
(Continued)

(52) U.S. Cl.
CPC ......... *G06Q 20/3227* (2013.01); *G06F 21/53* (2013.01); *G06Q 20/02* (2013.01);
(Continued)

(58) Field of Classification Search
CPC .......... G06Q 20/3227; G06Q 20/4012; G06Q 20/401; G06Q 20/40; G06Q 20/351;
(Continued)

(56) References Cited

U.S. PATENT DOCUMENTS 7,434,723 B1 * 10/2008 White .................... G06Q 20/20
235/375
2003/0145205 A1  7/2003 Sarcanin
(Continued)

FOREIGN PATENT DOCUMENTS

DE   102011109318 A1   2/2013
EP        2157540 A1 *  2/2010 ........... G06Q 20/105
(Continued)

OTHER PUBLICATIONS

English translation of the Written Opinion of the International Searching Authority dated May 29, 2017 for corresponding International Application No. PCT/EP2016/050316, filed Jan. 8, 2016.
(Continued)

*Primary Examiner* — Nelson S. Giddins
(74) *Attorney, Agent, or Firm* — David D. Brush; Westman, Champlin & Koehler, P.A.

(57) ABSTRACT

A method for processing, by a processing entity, of an authorization to implement a service and/or access an item. The method includes: reception, from a requesting device, of a request for implementing a service and/or accessing an item; searching for an indicator of dependency from at least one piece of data of said request for implementation; when an indicator of dependency is present, obtaining an authorization from a verification device to implement said service and/or access said item.

7 Claims, 3 Drawing Sheets

(30) Foreign Application Priority Data

Jan. 9, 2015 (FR) ..................................... 15 50193
Feb. 13, 2015 (FR) ..................................... 15 51239

(51) Int. Cl.

| | |
|---|---|
| *H04L 9/32* | (2006.01) |
| *G06Q 20/34* | (2012.01) |
| *G06Q 20/32* | (2012.01) |
| *G06Q 20/02* | (2012.01) |
| *G06Q 20/42* | (2012.01) |
| *H04L 29/06* | (2006.01) |
| *H04L 29/08* | (2006.01) |
| *H04W 12/08* | (2009.01) |
| *G06F 21/53* | (2013.01) |

(52) U.S. Cl.
CPC ..... *G06Q 20/351* (2013.01); *G06Q 20/35785* (2013.01); *G06Q 20/40* (2013.01); *G06Q 20/401* (2013.01); *G06Q 20/405* (2013.01); *G06Q 20/4012* (2013.01); *G06Q 20/40145* (2013.01); *G06Q 20/40975* (2013.01); *G06Q 20/42* (2013.01); *H04L 9/3226* (2013.01); *H04L 63/0428* (2013.01); *H04L 63/10* (2013.01); *H04L 63/101* (2013.01); *H04L 67/16* (2013.01); *H04W 12/08* (2013.01); *H04W 12/12* (2013.01); *G06Q 2220/00* (2013.01); *H04L 67/34* (2013.01); *H04L 67/42* (2013.01)

(58) Field of Classification Search
CPC .............. G06Q 20/42; G06Q 20/35785; G06Q 20/3278; G06Q 20/3229; H04L 63/10; H04L 9/3226; G06F 21/53

See application file for complete search history.

(56) References Cited

U.S. PATENT DOCUMENTS

| | | | |
|---|---|---|---|
| 2007/0078760 A1 | 4/2007 | Conaty et al. | |
| 2009/0294526 A1 | 12/2009 | Maw | |
| 2010/0114733 A1* | 5/2010 | Collas | G06Q 20/12 705/26.1 |
| 2010/0145850 A1 | 6/2010 | Nagai et al. | |
| 2011/0078081 A1* | 3/2011 | Pirzadeh | G06Q 20/20 705/44 |
| 2011/0238569 A1* | 9/2011 | Kim | G06Q 20/102 705/40 |
| 2012/0069772 A1 | 3/2012 | Byrne et al. | |
| 2012/0123883 A1* | 5/2012 | Charrat | G06Q 20/204 705/17 |
| 2013/0301830 A1* | 11/2013 | Bar-El | H04L 9/08 380/210 |
| 2014/0066015 A1* | 3/2014 | Aissi | H04W 12/06 455/411 |
| 2014/0074714 A1* | 3/2014 | Melone | G06Q 20/322 705/44 |
| 2014/0317686 A1* | 10/2014 | Vetillard | G06F 21/74 726/2 |
| 2015/0007335 A1 | 1/2015 | Buer et al. | |
| 2015/0120472 A1* | 4/2015 | Aabye | G06Q 20/36 705/16 |
| 2016/0063480 A1* | 3/2016 | Ballesteros | G06Q 20/3227 705/17 |
| 2017/0142090 A1* | 5/2017 | Mahaffey | H04L 63/0869 |

FOREIGN PATENT DOCUMENTS

| | | |
|---|---|---|
| EP | 2157540 A1 | 2/2010 |
| EP | 2455922 A1 | 5/2012 |
| EP | 2746981 A1 | 6/2014 |
| WO | 2004072914 A1 | 8/2004 |
| WO | 2013078499 A1 | 6/2013 |
| WO | 2013117061 A1 | 8/2013 |

OTHER PUBLICATIONS

English translation of the Written Opinion of the International Searching Authority dated Jun. 1, 2017 for corresponding International Application No. PCT/EP2016/050317, filed Jan. 8, 2016.
International Search Report dated Mar. 10, 2016 for corresponding International Application No. PCT/EP2016/050318, filed Jan. 8, 2016.
Written Opinion of the International Searching Authority dated Mar. 10, 2016 for corresponding International Application No. PCT/EP2016/050318, filed Jan. 8, 2016.
International Search Report dated Mar. 10, 2016 for corresponding International Application No. PCT/EP2016/050317, filed Jan. 8, 2016.
Written Opinion of the International Searching Authority dated Jul. 14, 2016 for corresponding International Application No. PCT/EP2016/050317, filed Jan. 8, 2016.
English translation of the Written Opinion of the International Searching Authority dated May 29, 2017 for corresponding International Application No. PCT/EP2016/050318, filed Jan. 8, 2016.
"EMV Mobile Contactless Payment: Technical Issues and Positions Paper", Internet Citation, Oct. 1, 2007 (Oct. 1, 2007), pp. 1-37, XP007908266.
International Search Report dated Mar. 10, 2016 for corresponding International Application No. PCT/EP2016/050316, filed Jan. 8, 2016.
Written Opinion of the International Searching Authority dated Mar. 10, 2016 for corresponding International Application No. PCT/EP2016/050316, filed Jan. 8, 2016.
Office Action dated Jun. 10, 2019 for corresponding U.S. Appl. No. 15/542,437, filed Jul. 9, 2017.
Office Action dated Jun. 28, 2019 for corresponding U.S. Appl. No. 15/542,591, filed Jul. 10, 2019.
EMV Integrated Circuit Card Specifications for Payment Systems, Book 3, Application Specification, Version 4.3, Nov. 2011.

\* cited by examiner

METHOD FOR PROCESSING AN AUTHORIZATION TO IMPLEMENT A SERVICE, DEVICES AND CORRESPONDING COMPUTER PROGRAM

CROSS-REFERENCE TO RELATED APPLICATIONS

This Application is a Section 371 National Stage Application of International Application No. PCT/EP2016/050316, filed Jan. 8, 2016, which is incorporated by reference in its entirety and published as WO 2016/110588 A1 on Jul. 14, 2016, not in English.

1. FIELD OF THE INVENTION

The proposed technique relates to the processing of online transactions. The proposed technique relates more particularly to the hierarchical processing of transactions. More specifically, the proposed technique can be used to secure an access to an item (also called an article or an asset) or to a service made by a person in authority (also known as a guardian) to implement said service or to access said item. The proposed method falls within the framework, for example, of a parent/child relationship or again custodial relationship.

2. PRIOR ART

There are techniques that enable a person who in authority over another person (i.e. who is this other person's guardian) to make sure that an item or a service remains inaccessible to unauthorized persons. The simplest and most efficient way to achieve this for an item is to keep it under lock and key, or to keep possession of the means needed for using this item: this is the case for example with car keys which can be kept by the guardian and given to the requesting person at this guardian's discretion.

For services such as, for example, Internet access or access to specific services on the Internet (for example social networks etc.), the simplest way is not to disclose a password which the guardian keeps to himself and enters when a request is made (if this guardian agrees to it of course).

For other types of services, such as for example payment services, authorization to make purchases or withdraw cash is often managed by a bank establishment: the guardian configures the access by the requesting person to his payment means by defining, for example, the maximum sums that can be withdrawn and/or spent etc.

However, these methods, which may be of variable efficiency, entail problems often related to the requirement that the guardian should be present beside the requesting person to validate or not validate access to the item or to the service. For banking services, while the presence of the guardian is not necessary, other problems arise. The ceiling on expenditure or cash withdrawals does prevent undue expenditure of excessive amounts of money. However, it is not easy to check the fine details of the expenditure. It is not possible for example to accept certain types of purchase and to reject other types of purchase.

This impossibility of providing control over the fine details is also detrimental in the case of services other than payment services. Thus, for example in the case of access to a social network, it is not possible to allow certain actions (for example adding comments) while prohibiting others (for example contacting unknown persons).

There is therefore a need to provide a method for processing an authorization to implement a service and/or access an item that does not have these prior-art drawbacks.

3. SUMMARY

The proposed technique does not have these drawbacks of the prior art. More particularly, the proposed technique enables the person who is the guardian of another person, to manage access to an item or to a service in a detailed manner while not requiring this guardian to be present.

More specifically, the proposed technique relates to a method for the processing, by a processing entity, of an authorization to implement a service and/or access an item. Such a method comprises:
  a step of reception, from a requesting device, of a request for implementing a service and/or accessing an item;
  a step of searching for an indicator of dependency from at least one piece of data of said request for implementation;
  when an indicator of dependency is present, a step for obtaining an authorization, from a verification device, to implement said service and/or access said item.

Thus, through the proposed technique, access to an item or the implementation of a service can be placed under the constraint of authorization by another device distinct from the requesting device.

According to one particular characteristic, the step for obtaining authorization, from a verification device, to implement said service and/or to access said item comprises:
  the obtaining of a piece of data representing a verification device from which the authorization must be requested;
  the transmitting of a notification to the verification device from which said authorization must be requested;
  a decision to issue authorization according to a piece of data or an absence of data received from the device.

According to one particular characteristic, the decision to issue authorization according to a piece of data or an absence of data received from the device comprises a reception of:
  either an authorization, comprising an entry into the verification device, of a piece of information liable to be compared with a piece of reference information;
  or an absence of authorization comprising:
    a specific rejection, transmitted in a response to the above-mentioned notification; or
    an absence of a response within an allotted time.

According to one particular characteristic, said piece of information liable to be compared with a piece of reference information is a personal identification code.

Thus, the proposed technique provides higher security of access to goods and services than do existing techniques.

According to one particular characteristic, the step of obtaining from a verification device furthermore comprises:
  a transmission, to the verification device, of a request for setting up a secured link;
  a setting up of a secured link between the processing entity and the trusted execution environment of the verification device;
  a transmission of the notification to the verification device by means of the secured link, accompanied by a request for entry of a PIN code;
  an implementation of a secured display module and a secured entry module;
  an encryption of the entered PIN code by the verification device;
  a transmission of the encrypted PIN code to the processing entity;

a verification of the validity of the entered PIN code by the processing entity.

According to another aspect, the described technique also relates to an entity for processing an authorization to implement a service and/or to access an item.

Such an entity comprises:

means for receiving a request for implementing a service and/or accessing an item;

means of searching for an indicator of dependency from at least one piece of data of said request for implementing;

means for the obtaining, from a verification device, of an authorization for implementing said service and/or accessing said item, said means being implemented when an indicator of dependency is present.

According to another aspect, the described technique also relates to a system for processing an authorization for implementing a service and/or accessing an item, a system characterized in that it comprises:

an entity for processing an authorization for implementing a service and/or accessing an item comprising:

means for receiving a request for implementing a service and/or accessing an item;

means of searching for an indicator of dependency from at least one piece of data of said request for implementing;

means for the obtaining, from a verification device, of an authorization for implementing said service and/or accessing said item, said means being implemented when an indicator of dependency is present.

a verification device comprising:

means for receiving a notification;

means for issuing an authorization comprising means for entering a secured personal identification code.

At least one embodiment of the proposed technique requires an implementation through a smartphone type of communications terminal, this terminal comprising a transaction securing module or secure element. Such a transaction securing module or secure element is configured for use within the framework of the present technique in order to set up a secured connection between the communications terminal and a server.

According to a preferred implementation, the different steps of the methods according to the proposed technique are implemented by one or more software programs or computer programs comprising software instructions to be executed by a data processor of a relay module according to the proposed technique and being designed to control the execution of the different steps of the methods.

The proposed technique is therefore also aimed at providing a program capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

The information carrier can be any entity or communications terminal whatsoever capable of storing the program. For example, the carrier can comprise a storage means such as a ROM, for example, a CD ROM or microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc.) and is capable of accessing hardware resources of this physical entity (memories, recording media, communications buses, input/output electronic boards, user interfaces etc.).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

Each component of the system described here above can of course implement its own software components.

The different embodiments mentioned here above can be combined with one another to implement the proposed technique.

4. FIGURES

Other features and advantages of the invention shall appear more clearly from the following description of a preferred embodiment, given by way of a simple illustratory and non-exhaustive example and from the appended drawings, of which.

5. DESCRIPTION 5.1 Principle

As explained, the object of the present technique is to enable the management of access to an item or a service in a finely precise way without requiring that a person with authority of verification or accreditation be close to or beside a person requesting access to an item or to a service. The proposed technique is highly useful for example in the case of parent/child relationships (in the context of empowering the child) and/or in the case of a guardian or custodial relationship implying that a person under guardianship requires permission from a responsible person to carry out such and such act of daily life.

The proposed technique generally implements several entities. Depending on the embodiments, these entities can be all distinct. Other embodiments can include the merging of the different entities, especially the server entities that are situated in the communications network and to which the verification device of the responsible user is connected.

Figure 1:
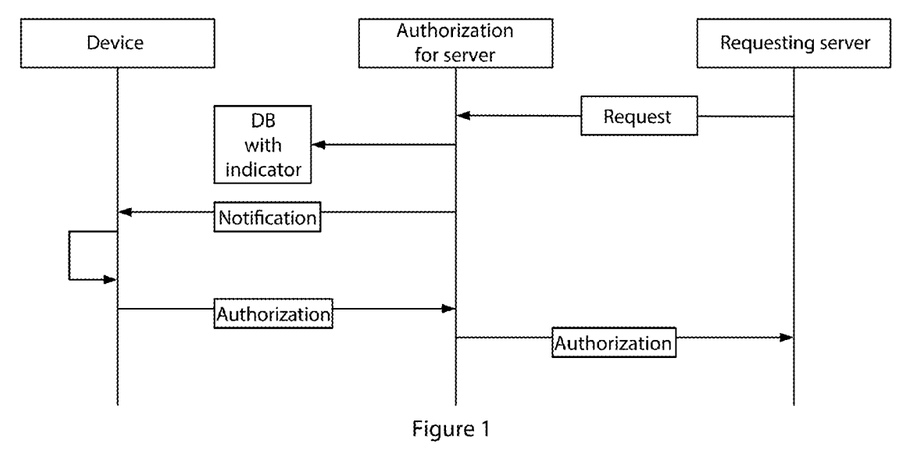
FIG. 1 is a block diagram of the proposed technique.
Figure 2:
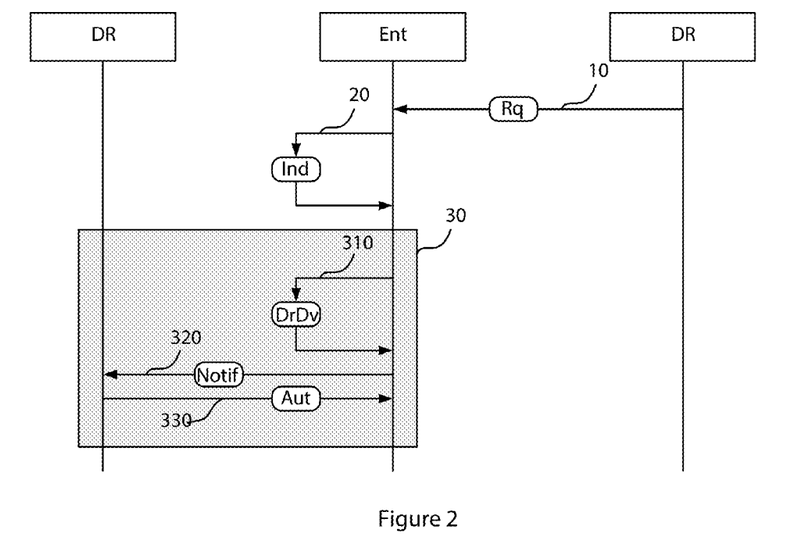
FIG. 2 is a detailed view of certain steps of implementation.

In general, as described with reference to FIG. 1 and FIG. 2, the proposed method comprises the following steps, within a server (which is a processing entity for access to the item or to the service):

- a step (10) for receiving a request (Rq) for implementing a service (or accessing an item): this request comprises firstly data used to identify the service in question, secondly an identifier of the requesting party for the service (for example an identifier of the child or again a bank account number or again a bank card number) and finally additional data depending on the service requested;
- a step (20) for obtaining an indicator of dependency (InD); this dependency indicator can be obtained for example by making a search, in a database (DB), for data needed to implement the service;
- when the server sees that an indicator of dependency is present and therefore that access to the service requires the obtaining (30) of permission (Aut) from a verification device, it implements this step (30) for obtaining authorization (Aut). The obtaining (30) of authorization comprises for example:
  - the obtaining (310) of a piece of data representing a verification device which has been asked for authorization; this piece of data can for example be an address at which the verification device must be contacted (IP address, MAC address for example);
  - the transmission (320) of a notification to the verification device from which this authorization must be requested; and
  - following this transmission,
    - the reception (330) from the verification device of:
      - either the authorization (Aut) taking the form, for example, of the entry, into the verification device that has received the notification, of a piece of information (InfS) that can be compared with a piece of reference information (InfR) such as for example a PIN or an encrypted PIN compared with a PIN or an encrypted reference PIN;
      - or an absence of physical authorization (NonAut) taking the form of:
        - a specific rejection transmitted in a response to the above-mentioned notification;
        - an absence of response within a given period of time.

The authorization is transmitted to the server (processing entity for access to the item or service) which in turn transmits this authorization if need be to the requesting entity (which may be another server or a device).

Indirectly and in a complementary way, the proposed technique can be applied equally well to the monitoring by a person, by himself or herself, of the use of his own items or service. For example in the case of monitoring of access to a social network, if a user receives a notification on his mobile telephone (smartphone), which is acting as a verification device, authorizing the publication, in his name, of a message on a social network whereas he is not currently connected to the social network and has not requested such publication, this can be the sign of hacking or identity theft. The proposed technique thus enables the simple and efficient management of this type of problem. Indeed, the indicator of dependency is not used solely to indicate a dependency of a service relative to a person in authority or a person of responsibility. It can also indicate a dependency with respect to a complementary authorization.

One particular embodiment relates no longer to the transmission of a simple message to a complementary device held by the user (such as a mobile communications terminal). Rather it relates in this particular embodiment to implementing a secured process of identification. Thus, unlike in the methods such as the 3D Secure (registered mark) method, the notification transmitted to the verification device gets inserted into a process of secured transmission of data to the verification device. This transmission process comprises:

- the setting up of a SSH type of secured link (with for example the setting up of a virtual private link) between the server and a user's verification device (for example his smartphone): this link can be set up for a limited duration;
- the obtaining of encryption hardware enabling the encryption of the data exchanged between the verification device and the server;
- the transmission of the notification to the user's verification device by means of the secured link accompanied by a request for entry of an identification code (of the PIN code or biometric authentication type);
- the encryption of the PIN code entered into the verification device by the user;
- the transmission of the encrypted PIN code to the server;
- the verification of the validity of the entered PIN code by the server.

This embodiment is therefore situated in the context of a processing operation that is relatively remote, in terms of securing, from a processing operation in which a code received by SMS (on the verification terminal) is entered in a field provided for this purpose (on the requesting party's terminal, therefore not on the verification terminal).

In one specific embodiment of the proposed technique, the device to which the notification of authorization is transmitted is a communications terminal, for example of the smartphone type.

In one embodiment of the present technique, which is, besides, complementary to the embodiment described here below (authorization of payment), the verification terminal (which takes the form of a smartphone type of communications terminal) comprises means of secured execution of certain specific commands. These means of secured execution comprise for example a secured display module and a secured entry module.

A secured display module ensures the integrity of a display on the screen of the verification terminal. It ensures that the data that it displays on the screen is not compromised (i.e. modified at a subsequent time by another process). A secured display module comprises a (hardware and/or software) interruption circuit enabling control over the display of the communications terminal especially to prevent a malicious software program or circuit from displaying information during the implementing of a secured process. The secured display module receives data to be displayed for example from a trusted execution processor and/or a network interface comprising data to be displayed (without modification or reprocessing). The secured display module displays this data and prevents any other (non-secured) module from altering this display.

A secured entry module guarantees the integrity of an entry made through the keying-in means of the verification terminal. It ensures that the data that it receives is not compromised (i.e. modified subsequently by another process or recorded in parallel by another process). A secured entry module comprises a (hardware and/or software) reception circuit enabling the direct reception, without any intermediaries, of information coming from the entry interface (touch-screen interface or mechanical-entry interface).

According to the technique proposed as an option, such a terminal also embeds a module known as a "secure element" (SE) or "securing element". A secure element is a securing module integrated into the communications terminal. Such a module can be used to secure data transmitted between the communications terminal and a device to which it is connected (for example a server). Such a module takes the form of a processor optionally comprising a dedicated secured memory. When it does not comprise a dedicated secured memory, such a processor comprises an interface providing access to a secured memory.

In one specific embodiment of the proposed technique, the device to which the notification of authorization is transmitted, also comprises a secured execution environment or trusted execution environment (TEE). The advance of this approach is that it implements a secure element (SE) for its securing characteristics and, at the same time, a trusted execution environment (TEE) for the richer execution environment that it offers. In other words, the trusted execution environment (TEE) is in charge of displaying the notification on the screen of the verification device and is in charge of securing the entry by the user in authority while the secure element offers encryption and processing functions that are more basic but also more secure. The advantage of this approach is that the secure element SE can be subjected to certification (for example bank certification) in a far simpler manner than would be the case with a trusted execution environment (TEE). This means that an additional advantage of the proposed solution, when it is used to make payment, lies in the fact that this solution can be certified in a much simpler way.

According to one aspect of the proposed technique, the verification device is furthermore connected, when powered on, to a control server. The control server is in charge of verifying that the verification device has not been compromised. When it starts up, the verification device gets connected to a server (which can be the same as the server described here above) to verify the compliance of the configuration. This verification is made by carrying out a registration with the server. This registration comprises an exchange of encrypted data between the verification device and the control server for example in the form of a dual "challenge/response" process. The control server is used to keep a list of communications terminals connected to the servers updated. The data (private keys/public keys) used to carry out the registration of the verification device with the control server are contained for example in the secure element integrated into verification device.

5.2 Description of One Particular Embodiment

The proposed technique can be applied promisingly in the case of hierarchy-based payment. For example in the context of a parent/child relationship, it can be useful (for the parent) to validate purchases made by the child in order to make sure for example that this child is not spending money thoughtlessly. This means that, in this specific case, the method that is the object of the invention is implemented in order to process a payment authorization. The payment authorization is given by the parent responsible for the child (this type of situation can also be implemented by any person under guardianship).

Figure 3:
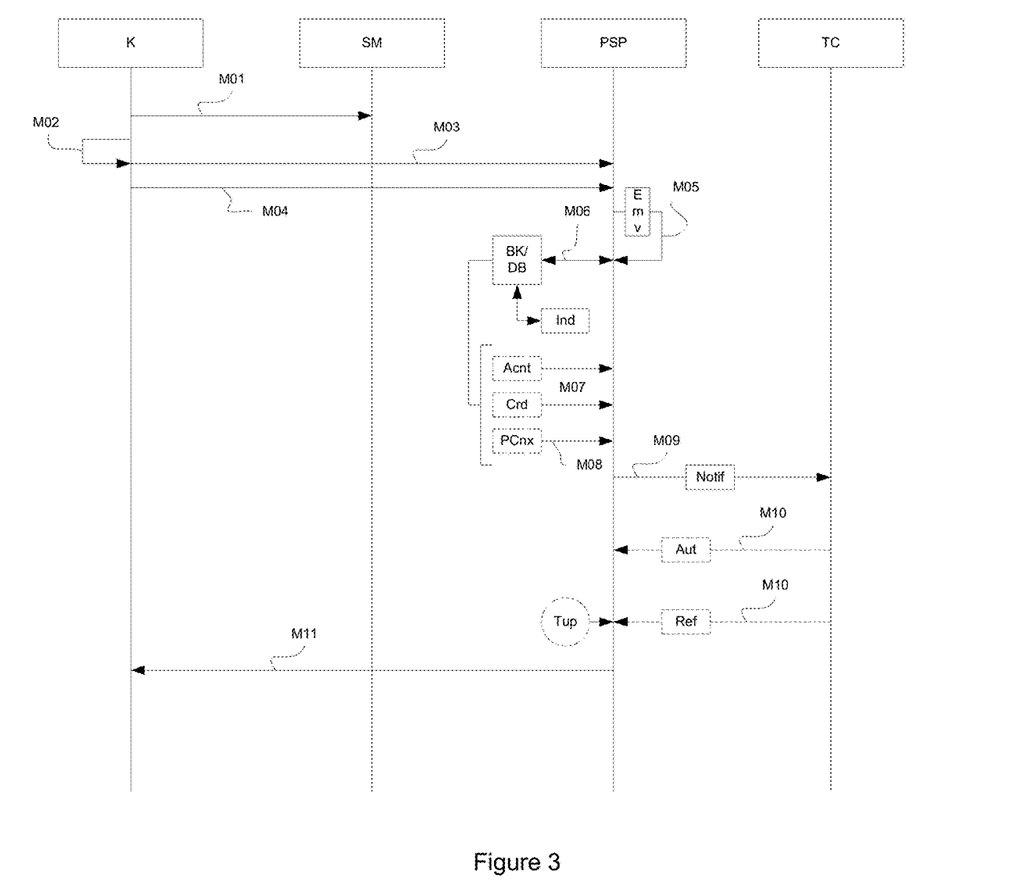
FIG. 3 explains the implementation for a hierarchical payment service.

In this case of use (payment service) the general operation is as follows:
- the child (or a person under guardianship) (K) fills (M01) basket of purchases, for example on a remote Internet site called a merchant site (SM);
- at the time of payment the child who possesses his own bank card selects (M02) a type of card to be used (Visa, MasterCard, Amex etc.) from among the types of cards available;
- this selection prompts the re-routing (M03) to a payment application managed by a payment service provider (PSP) in order to make payment;
- the child enters (M04) the data of his payment card in order to make payment (bearer's name and/or number and/or date of validity and/or verification code);
- an EMV transaction (in "card not present" mode) is then implemented (M05) by the payment service provider (to which the merchant site SM has delegated the implementation of the payment). This transaction includes an obtaining (M06) (for example a search within a database DB) of comparison data enabling verification of the validity of the entered data are valid (or again the obtaining of an authorization from the bank establishment BK);
- at the time of this obtaining (M06), the payment service provider PSP also obtains an indicator of dependency (Ind) of this payment data (dependency on additional authorization having to be provided by a verification device). Other parameters can also be obtained such as for example a possible financial ceiling for the authorization.
- when the payment service provider notes that, in order to be used, the card data provided to him (or the authorization provided to him) requires the obtaining of an authorization, the method then comprises:
  - the obtaining (M07) of the account (Acnt) and/or the card (Crd) for which the authorization has to be asked; and/or
  - the obtaining (M08) of at least one parameter (PCnx) of connection to a communications terminal (TC) at which this authorization must be requested (depending on the preliminarily obtained account data or card data or independently of this account data or card data; this is for example an IP address of a MAC address of the verification device);
  - the transmission (M09) of a notification (notif) to this communications terminal (by the method described here above);
  - the reception (M10):
    - either of authorization (Aut) taking the form for example of the entry on the verification device that has received the notification of a piece of information liable to be compared with a piece of reference information;
    - or of an absence of authorization taking the form of:
      - a specific rejection (Ref) transmitted in a response to the above-mentioned notification;
      - an absence of response within a given period of time (Tup).

The finalizing of the transaction (i.e. acceptance and payment or rejection) is then carried out by the payment service provider (PSP). A response if necessary is transmitted (M11) to the requesting terminal (the child's terminal).

As indicated here above, the transmission of notification to the communications terminal comprises the following steps which take place between the payment service provider and the parent's communications terminal:

a transmission to the verification device of a request for setting up a secured link;

the setting up of a secured link, for example of the SSH type (with for example the setting up of a virtual private link), between the processing entity and the trusted execution environment of the verification device of the parents' communications verification device; this link is set up for a limited period of time;

the obtaining of encryption hardware for the encryption of data exchanged between the communications verification device and the processing entity (complementary, temporary encryption hardware);

the transmission of the notification to the communications verification device by means of the secured link accompanied by a request for entry of a PIN code;

the implementing of a display module and a secured entry module to enable an equally secured entry of the PIN code;

the encryption of the (entered) PIN code by the communications verification device;

the transmission of the encrypted PIN code to the processing entity;

the verification of the validity of the entered PIN code by the processing entity.

The validity of the entered PIN code implies authorization: this means that it is the entry of a valid PIN code and the verification of its compliance that lead to the authorization. On the contrary, an absence of entry within a preset period of time or an erroneous entry leads to rejection.

In a complementary way, the method for obtaining authorization can implement a virtual payment terminal. The virtual payment terminal is instantiated by means of a server of a payment service provider. It makes it possible to set up a secured link with the verification terminal. Such an implementation is compliant with the methods described in the documents FR1550192 and FR1550193 incorporated by reference in the present patent application.

5.3 Implementing Devices

Figure 4:
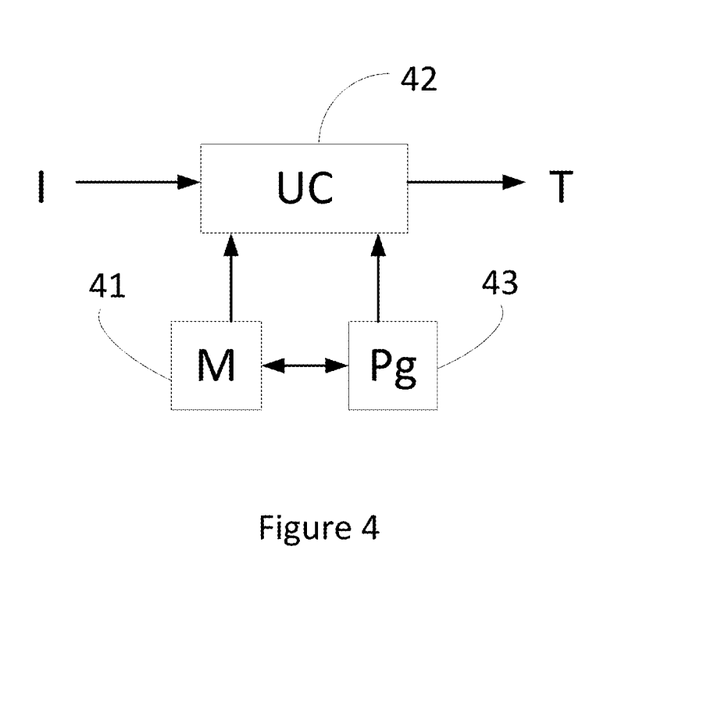
FIG. 4 presents the structure of an authorization processing device.

Referring to FIG. 4, a description is made of a processing device comprising means for executing the method described here above.

For example, the processing device comprises a memory 41 constituted by a buffer memory, a processing unit 42, equipped for example with a microprocessor and driven by a computer program 43 implementing the steps needed for the processing of authorization to implement services or to access items.

At initialization, the code instructions of the computer program 43 are for example loaded into a memory and then executed by processor of the processing unit 42. The processing unit 42 inputs for example a set of initial lexemes or existing dictionary data. The microprocessor of the processing unit 42 implements the steps of the method according to the instructions of the computer program 43 to enable access to the item or to the service.

To this end, the processing device comprises, in addition to the buffer memory 41, means for obtaining a piece of information external to the device such as a set of data accessible in a database; these means can take the form of a module for access to a communications network such as a network card. The device also comprises means for processing this data to deliver data enabling access to a verification device; these processing means include for example a processor specialized in this task. The device also comprises one or more means of access to one or more databases. The device also comprises means for updating authorization and/or access to items or services, especially means for weighting relationships between the lexical forms and/or grammatical forms forming the dictionary.

These means can be driven by the processor of the processing unit 42 as a function of the computer program 43.

Figure 5:
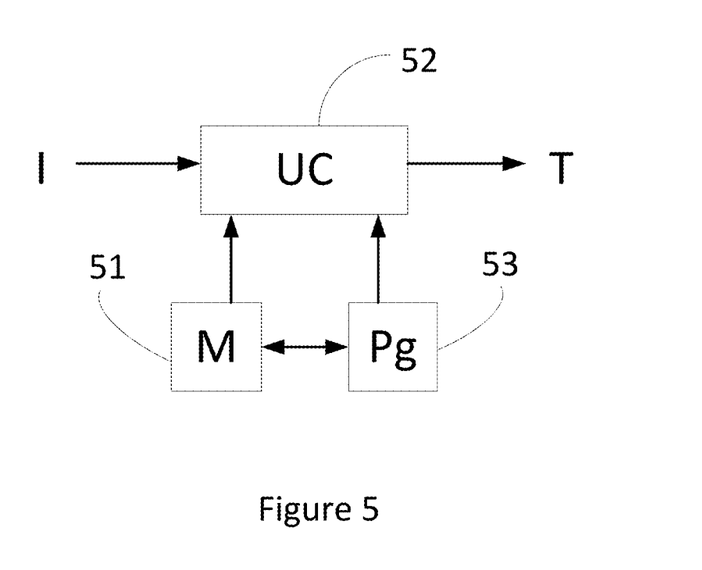
FIG. 5 presents the structure of a communications device.

Referring to FIG. 5, a description is provided of a verification device comprising means for executing the method described here above.

For example, the verification device comprises a memory 51 constituted by a buffer memory, a processing unit 52 equipped for example with a microprocessor and driven by the computer program 53 implementing the steps needed to implement the verification functions.

At initialization, the code instructions of the computer program 53 are for example loaded into a memory and then executed by the processor of the processing unit 52. The processing unit 52 inputs for example a notification. The microprocessor of the processing unit 52 implements the steps of the method of creation according to the instructions of the computer program 53 to enable the entry of an authorization code (a PIN code for example).

To this end, the device comprises, in addition to the buffer memory 51, display and entry means. These means can take the form of a processor or a set of secured resources enabling the securing of the authorization entry. The device also comprises cryptographic processing means. These processing means comprise for example a dedicated encryption processor and encryption keys such as session keys derived from an initial key.

These means can be driven by the processor of the processing unit 52 as a function of the computer program 53.

The invention claimed is:

1. A method comprising:
    processing by a processing entity, a payment transaction to implement a service and/or access an item, comprising:
        receiving by the processing entity, from a requesting device, a payment request for implementing said service and/or accessing said item, said payment request comprising at least one payment information coming from a payment card;
        searching by the processing entity for an indicator of dependency from at least one piece of data of said payment request, the indicator indicating dependency on additional payment authorization for the payment transaction having to be provided by a verification device; and
        when the indicator of dependency is present, the processing entity obtaining the additional payment authorization from the verification device to implement said service and/or access said item, the obtaining said additional payment authorization comprising:
            transmitting by the processing entity, to the verification device, a request for setting up a secured link;
            setting up by the processing entity a secured link between the processing entity and a trusted execution environment of the verification device;
            transmitting by the processing entity a notification to the verification device by using the secured link, accompanied by a request for entry of a PIN code;
            receiving by the processing entity an encrypted PIN code transmitted through the secured link by the trusted environment of the verification device in reply to the notification, the PIN code having been entered on the verification device through a secured display module and a secured entry module; and verifying by the processing entity validity of the entered PIN code by the processing entity.

2. The method according to claim 1, obtaining the additional payment authorization, from the verification device, to implement said service and/or to access said item comprises:

obtaining a piece of data representing the verification device from which authorization must be requested;

transmitting the notification to the verification device from which said additional payment authorization must be requested; and making a decision to issue the additional payment authorization according to a piece of data or an absence of data received from the verification device.

3. The method according to claim 2, wherein the decision to issue the additional payment authorization according to a piece of data or an absence of data received from the verification device comprises receiving:

either an authorization, comprising an entry into the verification device, of a piece of information liable to be compared with a piece of reference information;

or an absence of authorization comprising:
a specific rejection, transmitted in a response to the above-mentioned notification; or
an absence of a response within an allotted time.

4. The method for processing according to claim 3, wherein said piece of information liable to be compared with a piece of reference information is a personal identification code.

5. An entity for processing a payment transaction for implementing a service and/or to access an item, the entity comprising:

a processor; and a non-transitory computer-readable data medium comprising instructions of a computer program stored thereon, which when executed by the processor configure the processing entity to:

receive a payment request for implementing a service and/or accessing an item, said payment request comprising at least one payment information coming from a payment card;

search for an indicator of dependency from at least one piece of data of said payment request, the indicator indicating dependency on additional payment authorization for the payment transaction having to be provided by a verification device;

obtain, from the verification device, the additional payment payment authorization for implementing said service and/or accessing said item, when the indicator of dependency is present, the obtaining said additional payment authorization comprising:

transmitting, to the verification device, a request for setting up a secured link;

setting up a secured link between the processing entity and a trusted execution environment of the verification device;

transmitting a notification to the verification device by using the secured link, accompanied by a request for entry of a PIN code;

receiving an encrypted PIN code transmitted through the secured link by the trusted environment of the verification device in reply to the notification, the PIN code having been entered on the verification device through a secured display module and a secured entry module; and verifying validity of the entered PIN code by the processing entity.

6. A system for processing a payment transaction for implementing a service and/or accessing an item, wherein the system comprises:

a processing entity for processing an authorization for implementing a service and/or accessing an item, which comprises:

a first processor; and a non-transitory computer-readable data medium comprising instructions of a computer program stored thereon, which when executed by the first processor configure the processing entity to:

receive a payment request from a requesting device for implementing a service and/or accessing an item, said payment request comprising at least one payment information coming from a payment card;

search for an indicator of dependency from at least one piece of data of said payment request, the indicator indicating dependency on additional payment authorization for the payment transaction having to be provided by a verification device;

obtain, from the verification device, the additional payment authorization for implementing said service and/or accessing said item, when the indicator of dependency is present, the obtaining said additional payment authorization comprising:

transmitting, to the verification device, a request for setting up a secured link;

setting up a secured link between the processing entity and a trusted execution environment of the verification device;

transmitting a notification to the verification device by using the secured link, accompanied by a request for entry of a PIN code;

receiving the encrypted PIN code from the verification device, through said secured link; and verifying validity of the entered PIN code by the processing entity;

the verification device, which comprises:

a second processor; and a non-transitory computer-readable data medium comprising instructions of a computer program stored thereon, which when executed by the second processor configure the verification device to:

receive the request for setting up the secured link;

set up the secured link between the processing entity and a trusted execution environment of the verification device;

receive the notification by using the secured link, accompanied by the request for entry of the PIN code;

implement a secured display module and a secured entry module, which enable entry of the PIN code;

encrypt the entered PIN code, by the trusted execution environment of the verification device; and transmit the encrypted PIN code to the processing entity, through said secured link.

7. A non-transitory computer-readable medium comprising a computer program product -stored thereon comprising program code instructions for executing a method for processing a payment transaction when the instructions are executed on a processor of a processing entity, wherein the instructions configure the processing entity to perform acts comprising:

processing a payment transaction to implement a service and/or access an item, comprising:

receiving by the processing entity, from a requesting device, a payment request for implementing said service and/or accessing said item, said payment request comprising at least one payment information coming from a payment card;

searching by the processing entity for an indicator of dependency from at least one piece of data of said payment request for implementing, the indicator indicating dependency on additional payment authorization for the payment transaction having to be provided by a verification device; and when the indicator of dependency is present, obtaining the additional payment authorization from the verification device to implement said service and/or access said item, the obtaining said additional payment authorization comprising:

transmitting by the processing entity, to the verification device, a request for setting up a secured link;

setting up by the processing entity a secured link between the processing entity and a trusted execution environment of the verification device;

transmitting by the processing entity a notification to the verification device by using the secured link, accompanied by a request for entry of a PIN code;

receiving by the processing entity an encrypted PIN code transmitted through the secured link by the trusted environment of the verification device in reply to the notification, the PIN code having been entered on the verification device through a secured display module and a secured entry module; and verifying validity of the entered PIN code by the processing entity.

\* \* \* \* \*

UNITED STATES PATENT AND TRADEMARK OFFICE
CERTIFICATE OF CORRECTION

| | |
|---|---|
| PATENT NO. | : 10,482,450 B2 |
| APPLICATION NO. | : 15/542436 |
| DATED | : November 19, 2019 |
| INVENTOR(S) | : Quentin |

Page 1 of 1

It is certified that error appears in the above-identified patent and that said Letters Patent is hereby corrected as shown below:

In the Claims

In Claim 5, Column 11, Line 52:
Please delete "payment payment" and insert therefor --payment--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*